(12) United States Patent
Mia et al.

(10) Patent No.: US 8,384,595 B2
(45) Date of Patent: Feb. 26, 2013

(54) POSITION ESTIMATION THROUGH ITERATIVE INCLUSION OF MEASUREMENT DATA

(75) Inventors: Rashidus S Mia, Phoenixville, PA (US); Robert J Anderson, Phoenixville, PA (US); Pete A Boyer, Chesterbrook, PA (US)

(73) Assignee: TruePosition, Inc., Berwyn, PA (US)

( * ) Notice: Subject to any disclaimer, the term of this patent is extended or adjusted under 35 U.S.C. 154(b) by 177 days.

(21) Appl. No.: 12/970,594

(22) Filed: Dec. 16, 2010

(65) Prior Publication Data

US 2012/0154218 A1    Jun. 21, 2012

(51) Int. Cl.
*G01S 3/16* (2006.01)
*G01S 3/02* (2006.01)
(52) U.S. Cl. .......................................... 342/378; 342/465
(58) Field of Classification Search .................. 342/378, 342/450, 453, 465; 455/456.1
See application file for complete search history.

(56) References Cited

U.S. PATENT DOCUMENTS

| | | | |
|---|---|---|---|
| 4,728,959 A | 3/1988 | Maloney et al. |
| 5,327,144 A | 7/1994 | Stilp et al. |
| 5,608,410 A | 3/1997 | Stilp et al. |
| 6,047,192 A | 4/2000 | Maloney et al. |
| 6,483,460 B2 | 11/2002 | Stilp et al. |
| 6,782,264 B2 | 8/2004 | Anderson |
| 6,876,859 B2 | 4/2005 | Anderson et al. |
| 7,167,713 B2 | 1/2007 | Anderson |
| 2002/0101375 A1 | 8/2002 | Stilp et al. |
| 2010/0087204 A1 | 4/2010 | Islam et al. |
| 2010/0234045 A1 | 9/2010 | Karr et al. |

OTHER PUBLICATIONS

International Patent Application No. PCT/US11/63250: International Search Report and Written Opinion dated Mar. 2, 2012, 11 pages.
U.S. Appl. No. 11/533,310, filed Sep. 19, 2006, Ward.
U.S. Appl. No. 11/150,414, filed Jun. 10, 2005, Anderson.

*Primary Examiner* — Dao Phan
(74) *Attorney, Agent, or Firm* — Woodcock Washburn LLP

(57) ABSTRACT

In a wireless location system configured to use a baseline correlation method, an iterative approach to increasing location accuracy is disclosed. The quality of received signals is ordered from highest to lowest and used to calculate an initial location. The initial location is modified using the lower quality signals as constrained by the time and frequency deviation from the initial location and velocity estimate.

72 Claims, 5 Drawing Sheets

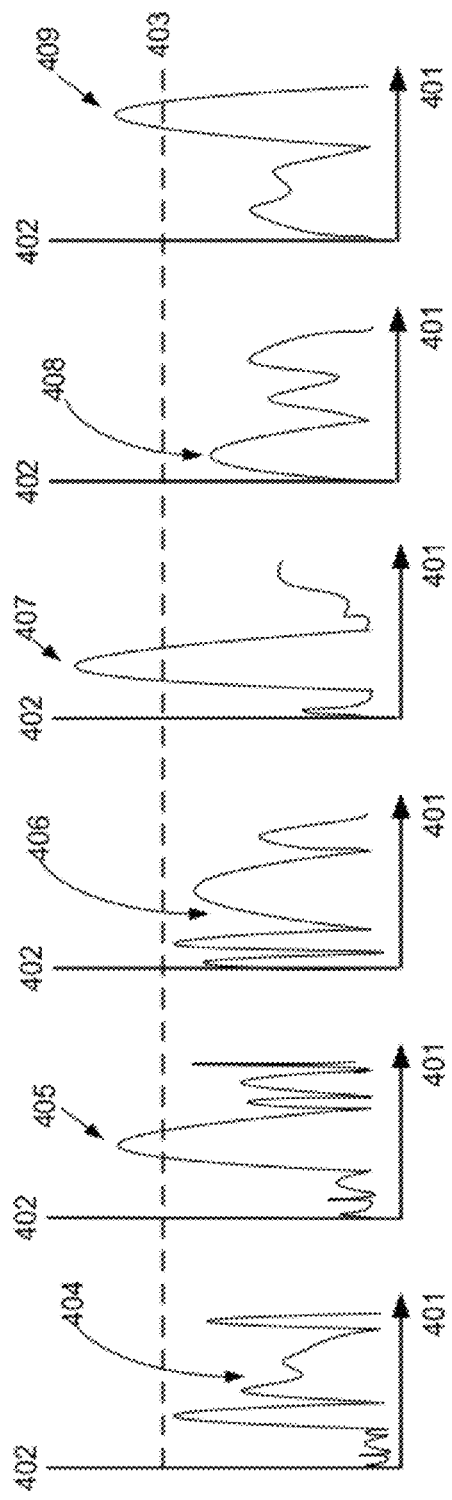
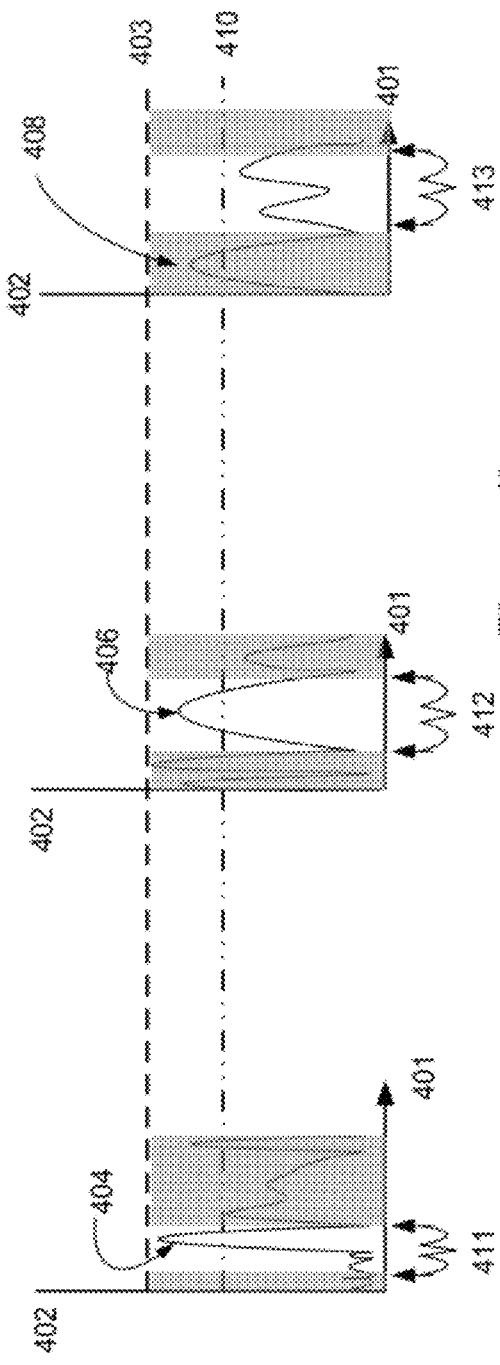
Figure 4a
Figure 4b

POSITION ESTIMATION THROUGH ITERATIVE INCLUSION OF MEASUREMENT DATA

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to increasing the accuracy of a network-based wireless location system.

BACKGROUND

Early work relating to network-based Wireless Location Systems (WLSs) is described in U.S. Pat. No. 4,728,959; "Direction Finding Localization System" (issued Mar. 1, 1998) which discloses a system for locating cellular telephones using angle of arrival (AOA) techniques and U.S. Pat. No. 5,327,144, (Issued Jul. 5, 1994) "Cellular Telephone Location System," which discloses a system for locating cellular telephones using time difference of arrival (TDOA) techniques. Further enhancements of the system disclosed in the '144 patent are disclosed in U.S. Pat. No. 5,608,410, (Issued Mar. 4, 1997), "System for Locating a Source of Bursty Transmissions." Location estimation techniques for wide-band wireless communications systems were further developed in U.S. Pat. No. 6,047,192 (Issued April 4, 200), "Robust, Efficient Localization System."

All of these patents are assigned to TruePosition, Inc., the assignee of the present invention. TruePosition has continued to develop significant enhancements to the original inventive concepts. First commercially deployed in 1998 by TruePosition in Houston, Tex., overlay network-based wireless location systems have been widely deployed in support of location-based services including emergency services location. The ability to routinely, reliably, and rapidly locate cellular wireless communications devices has the potential to provide significant public benefit in public safety and convenience and in commercial productivity.

Use of constraints on signal time and frequency deviations from an expected value has previously been considered in TruePosition's U.S. Pat. No. 6,876,859; "Method for estimating TDOA and FDOA in a wireless location system." This patent taught an approach that limited the initial search space based on the known distance of receivers to the wireless location system. The frequency search range was similarly constrained to a range accommodating the likely velocity of the mobile device.

The inventive techniques and concepts described herein apply to time and frequency division multiplexed (TDMA/FDMA) radio communications systems including the widely used IS-136 (TDMA), GSM, and OFDM (e.g. eUTRAN/LTE, IEEE 802.16 and IEEE 802.20) wireless systems, as well as code-division radio communications systems such as CDMA (IS-95, IS-2000) and Universal Mobile Telecommunications System (UMTS), the latter of which is also known as W-CDMA. There are many more types of air interfaces used throughout the world, and there is no intent to exclude any air interface from the inventive concepts described within this specification. Indeed, those skilled in the art will recognize other radio air interfaces used elsewhere are derivatives of or similar in class to those described above.

A position estimate typically requires multiple baseline measurements that can be corrupted by factors such as noise and fading. Errors that are caused by these factors may be accounted for by weighing the contribution of measurements in the position estimation algorithm based on knowledge of the type of degradation. However, one or more relatively poor measurements may badly skew an otherwise low error position estimate.

SUMMARY

In a wireless location system configured to use the baseline correlation method, an iterative approach to increasing location accuracy is disclosed. The quality of received signals is ordered from highest to lowest and used to calculate an initial location. The initial location is modified using the lower quality signals as constrained by the time and frequency deviation from the initial location and velocity estimate.

One illustrative embodiment of the present invention provides a method for increasing the accuracy of a wireless location system (WLS). This embodiment of the inventive method includes the step of receiving an uplink signal from a mobile device at a plurality of geographically dispersed location measuring units (LMUs). The uplink signal received at each LMU is correlated with a reference signal, and then baselines corresponding to respective pairs of LMUs are defined. The baselines are ranked based on a quality metric. Next, an initial location solution is determined for the mobile device. The initial location solution is preferably based on at least two baselines but less than all of the baselines. Then, one or more additional baselines are employed to improve upon the initial location solution until a stopping condition is met.

In the illustrative embodiments, the stopping condition is met when there is excessive deviation of a current estimate of the location solution from a prior estimate of the location solution. Moreover, a common correlation threshold may be employed to select baselines of a predetermined quality for the initial location solution, and the initial location solution may be employed to time filter correlation data corresponding to non-selected baselines. The filtered correlation signal may be evaluated against a secondary threshold to identify additional baselines to include in the location solution.

In the illustrative embodiments, a deviation metric is computed for remaining baselines using the initial location solution. When computing the deviation metric, a baseline measurement error is computed assuming that the current location solution is accurate and baselines with the smallest deviation are identified as candidates for use in subsequent iterations. For example, the deviation metric may be computed as the magnitude of the difference between a measured TDOA value for one of the remaining baselines and a TDOA value determined by the initial location solution. In this regard, after the initial location solution and computation of the deviation metric, an iterative sequence is entered wherein the baselines identified as candidates for use in subsequent iterations are reweighted based on the deviation metric. The baselines may be reweighted using a generalized weighting that includes the deviation contribution and the original weight, and once the baseline weighting has been updated, the location solution may be re-determined using one or more additional baselines of the reweighted baselines.

In the embodiments recounted above, the stopping condition comprises a determination that additional baselines do not exist, that an empirically determined baseline deviation threshold is exceeded, or that a magnitude of the difference between the next candidate baseline's weight and the weight of the baseline that was most recently added exceeds a predetermined threshold.

Additional features and aspects of the present invention are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 4a and 4b depict the use of geographic windowing for the selection of secondary baselines.

DETAILED DESCRIPTION OF ILLUSTRATIVE EMBODIMENTS

We will now describe illustrative embodiments of the present invention. First, we provide a detailed overview of the problem and then a more detailed description of example embodiments of the present invention.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

A network-based wireless location system using Time-Difference-of-Arrival (TDOA) or TDOA in combination with another network-based location technology (e.g., cell-ID with ranging, Signal Strength Measurement (SSM) (also known as RF fingerprinting), Angle of Arrival (AoA)) or a mobile-based location technology (e.g., Global Navigation Satellite Positioning (GNSS), Observed Time-Difference-of-Arrival (OTDOA), Enhanced Observed Time Difference (EOTD)) uses network-based receivers either overlaid on the wireless communications network (WCN) or incorporated into the base station radio circuitry and software. Mobile-based wireless location techniques using TDOA or TDOA in combination with another location technique may also benefit from the invention disclosed herein.

Figure 1:
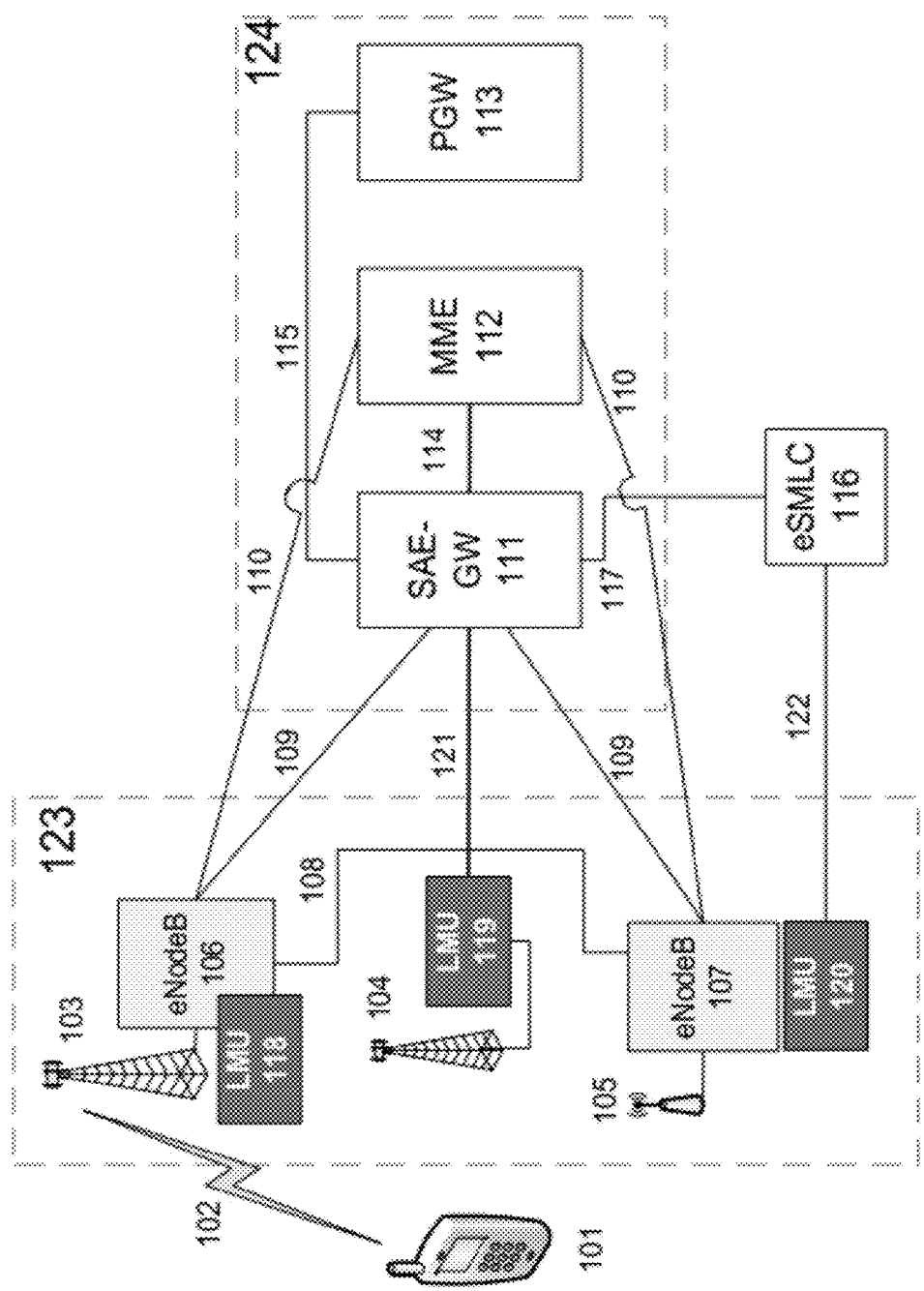
FIG. 1 schematically depicts an example eUTRAN/LTE wireless communications network with a network-based wireless location system.

An illustrative example of a network-based WLS deployed within a WCN is shown in FIG. 1. Illustrated in this example network is a 3GPP defined eUTRAN radio access network 123 and Evolved Packet Core (EPC) 124. Also shown are network-based Location Measurement Units (LMUs) 118 119 120 and evolved Serving Mobile Location Center (eS-MLC) 116. LMU 118 119 120 and eSMLC 116 can be physical units or functional components or some combination thereof. For example, LMU 119 can be a standalone unit with its own antenna and amplifier equipment. LMU 120 can be co-located and deployed with an eNodeB (eNB) to take advantage of the attendant antenna, backhaul, and electrical and environmental facilities. LMU 118 can be part of an integrated unit, wherein the LMU is a functional entity residing in the eNB circuitry and software. As shown in FIG. 1, multiple types of LMU instantiations may exist in the same network.

In an LTE radio air interface network 123, mobile device or user equipment (UE) 101 communicates over the LTE air interface 102 to the serving eNB 106 via the deployed antenna array 103. The LTE air interface 102 has an OFDM-based downlink and SC-FDMA-based uplink. The eUTRAN network 123 includes antenna arrays 103 105 serving attendant eNodeBs 106 107 with associated internode communications, the X2 interface 108 and S1-U backhaul 109, and the S1-MME interface 110.

The System Architecture Evolution Gateway (SAE-GW) 111, also referred to as the Serving Gateway (S-GW), is a primarily packet routing entity with bridging abilities to other LTE and non-LTE networks. In this example SAE-GW 111 also forwards the packet traffic from the LMUs 118 119 deployed in its service area to the eSMLC 116. Packet Data between the eSMLC 116 and an LMU 120 may be sent via a distinct digital connection 122 and not routed by the SAE-GW 111. In practice, the SAE-GW 111 may be combined on the same platform as the Mobility Management Entity (MME) 112 for small systems, but generally the SAE-GW 111 will be a separate, scalable subsystem with a many-to-1 relationship with the MME 112.

The MME 112 is the central controller for the LTE network. The MME 112 handles inter-system functions as well as authentication control, admission control, roaming control and selection of SAE-GW 111 for the UE.

The Public Data Network Gateway (PGW) 113 is the firewall and connection point between the LTE network and external data networks. As the firewall, the PGW 113 enables operator policy enforcement, packet screening and filtering for each UE, charging support, and Lawful Intercept.

As the connection point, the PGW 113 acts as the entry and exit point for data traffic between the UE 101 and external packet data networks (not shown). The SAE-GW 111 is connected to the MME(s) 112 via the standardized S11 interface 114. The SAE-GW 111 is connected to the PGW 113 via the standardized S5 interface 115. The eSMLC 116 is connected to MME 112 and the LPPa interface 117. A connection (not shown) between the SAE-GW 111 and the eSMLC 116 has been proposed to facilitate the transfer of information from LMUs 118 119 that use not-yet standardized messaging present in the eNB 118 backhaul or not-yet standardized messaging from standalone LMUs 119 using a specialized backhaul 121.

In the example network, the eSMLC 116 is shown as a standalone node, while LMUs 118 120 are integrated into or co-located with the eNodeBs and reuse antenna and backhaul communications resources. A standalone LMU 119 is also shown with dedicated backhaul 121 and dedicated antenna array(s) 104. Besides the LMU 118 119 120 and eSMLC 116 nodes and the modified backhaul 109 110, the specialized backhaul 121, and the separate backhaul 122, 3GPP technical specifications can be found for the other nodes and interfaces.

Embodiments described herein may execute on one or more physical components that may include computers and computing systems. The components can include a processor, memory, and a system bus that couples various system components including the memory to the processor. The memory may include read only memory (ROM) and random access memory (RAM). The components may further include a hard disk drive, an optical disk drive, or other such storage devices. In some embodiments, computer executable instructions embodying aspects of the disclosure may be stored in ROM, hard disk, RAM, and other storage devices.

Figure 2:
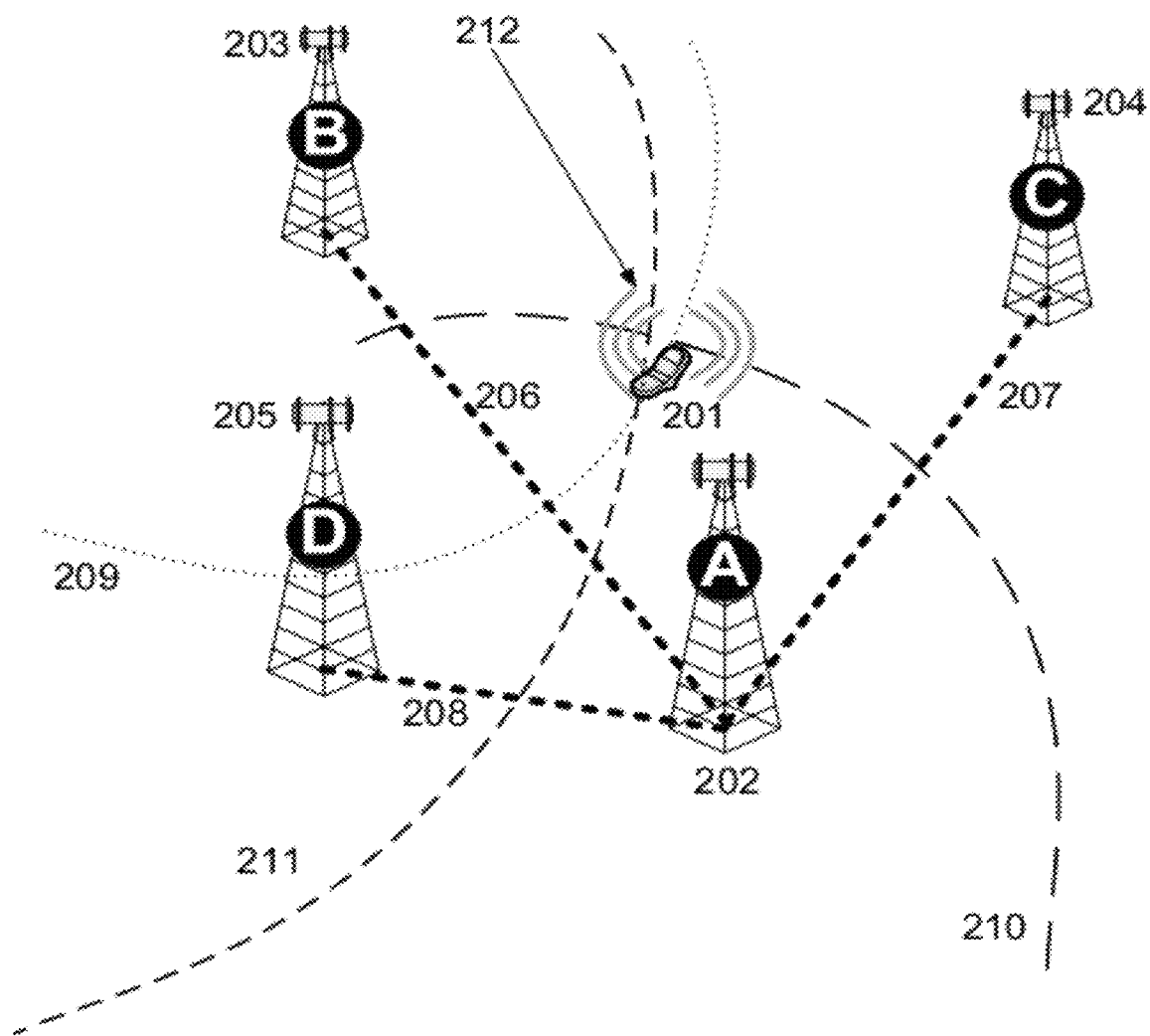
FIG. 2 geographically depicts an example of a U-TDOA location using the baseline correlation method.

Embodiments of the present invention incorporate the use of cross-correlation and baselines as originally described in U.S. Pat. No. 5,327,144; "Cellular telephone location system" as expanded in U.S. Pat. No. 5,608,410; "System for locating a source of bursty transmissions cross reference to related applications." FIG. 2 illustrates an example of a time-difference-of-arrival location estimate using the baseline correlation method.

The mobile device 201 transmits an uplink signal 212. The LMU co-located in this example in the cell towers "A" 202, "B" 203, "C" 204, and "D" 205 are tasked to collect the uplink signal 212. The LMU co-located in cell site "A" 202 is found to have the best received signal quality of the uplink signal 212 and is selected as the reference. The reference and the collected signal from each tasked LMU is correlated and hyperbolas 209 210 211 formed for each baseline 206 207 208. The intersection of the hyperbolas 209 210 211 is then reported as the location of the mobile device 201.

A position estimate typically requires multiple baseline measurements that can be corrupted by known factors such as noise and fading. Errors that are caused by these factors are usually accounted for by weighing the contribution of measurements in the position estimation algorithm based on knowledge of the type of degradation.

One or more relatively poor measurements may badly skew an otherwise low error position estimate. The method disclosed herein removes poor measurements iteratively by starting with a small number of relatively good baselines to achieve an initial solution. Baselines with smaller errors relative to the initial solution are then iteratively used in subsequent location solutions. A stopping condition is triggered when there is excessive deviation of the location solution from a prior estimate indicating that new additions are likely to be measurement outliers.

This technique differs from other techniques in that rather than excluding a few measurement outliers, this method starts with a smaller number of high confidence measurements and then incrementally adds in additional measurements to improve the position estimate.

Figure 3:
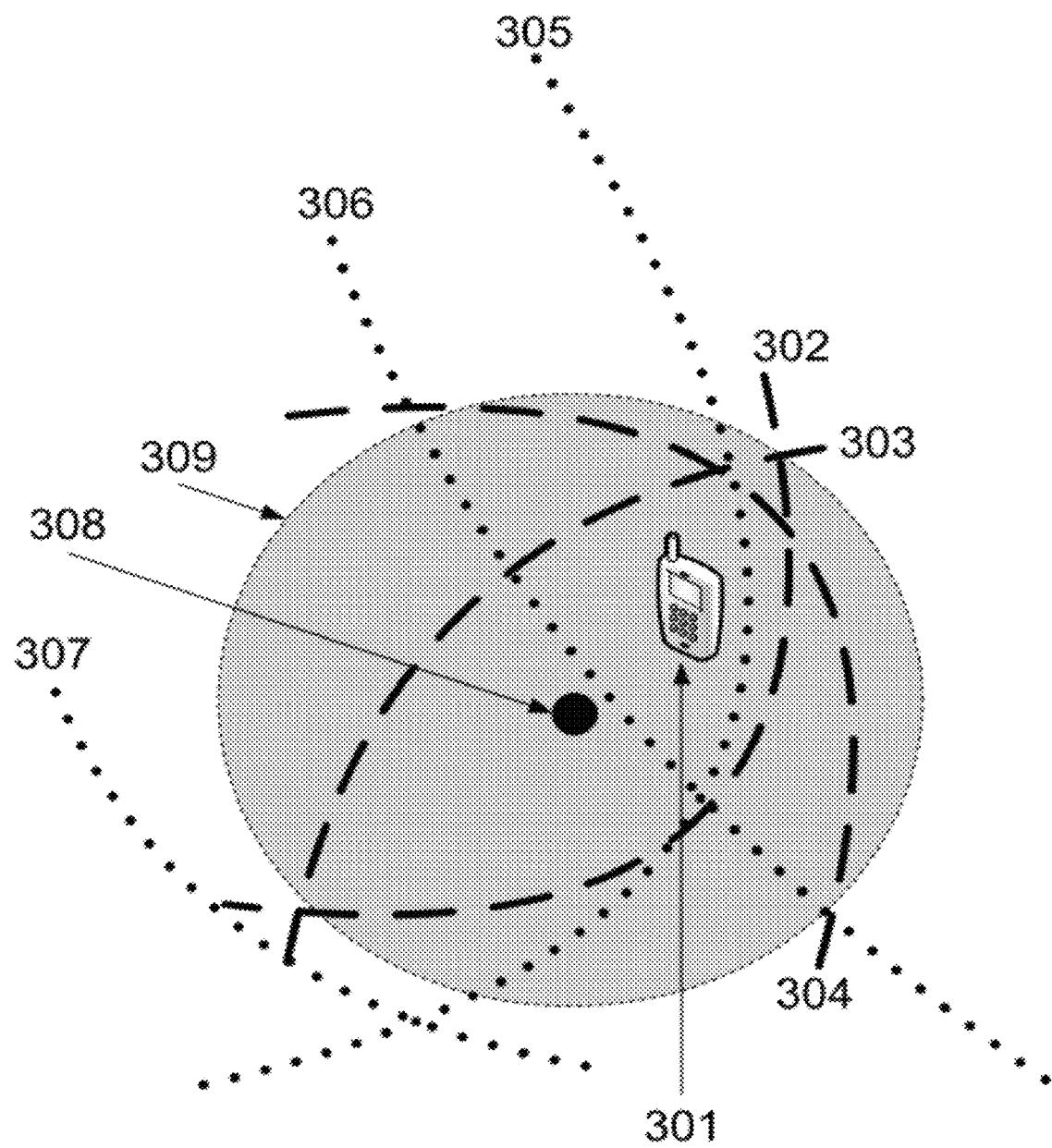
FIG. 3 illustrates the geographic constraining of range based on a first position and error estimate for an iterative location calculation using primary baselines.

FIG. 3 geographically depicts the geographic bracketing of baseline measurements. In the figure, mobile device 301 is being located, resulting in multiple baselines, each with a corresponding hyperbolic isochron 302 303 304 305 306 307. Based on signal quality, the three best isochrons 302 303 304 are selected for the initial location estimation. The resulting initial location 308 and error area 309 are shown geographically.

The remaining lower quality baseline isochrons 305 306 307 are then iteratively evaluated for inclusion in subsequent location determinations. As can be seen in FIG. 3, inclusion of isochrons 305 and 306 would serve to improve the location from the initial 308 to the actual 301. The geographic window developed from the error estimation 309 (the error shape is here shown as a circular error probability for simplicity, but any arbitrary polygon shape is possible) serves to exclude isochron 307 from inclusion in the location determination.

While FIG. 3 illustrates a 2-dimensional example, depending on the antenna deployed, a 3-dimensional solution using 3-dimensional baselines and hyperboloids is possible, allowing for determination of latitude, longitude, and altitude.

FIGS. 4a and 4b illustrate the selection of correlation signals for inclusion in the location determination based on signal quality. In FIG. 4a, six different correlation signals 404 405 406 407 408 409 corresponding to six baselines are shown. Each signal is plotted over time 401 versus correlation value 402. A common correlation threshold 403 is used to select baselines of a predetermined quality for the initial location determination (a minimum of three are typically required for TDOA calculation).

In FIG. 4b, correlation signals 404 406 408 of insufficient quality for inclusion into the initial location determination are shown. In this case, correlation signals 404 406 408 do not surpass the first, common correlation threshold 403. Using the results of the initial location determination, a time filtering mechanism is shown, constraining the correlation signal to a time window 411 412 413 specific to each baseline based on the position of the receiver stations from the initial location determination and error. The filtered correlation signal is then evaluated against a secondary threshold 410. Signals exceeding the secondary threshold 410 are then iteratively included into subsequent location estimations. In the case of signal 408, although the secondary threshold 410 is exceeded, the correlation peak is outside the time window 413 and therefore still excluded.

Figure 5:
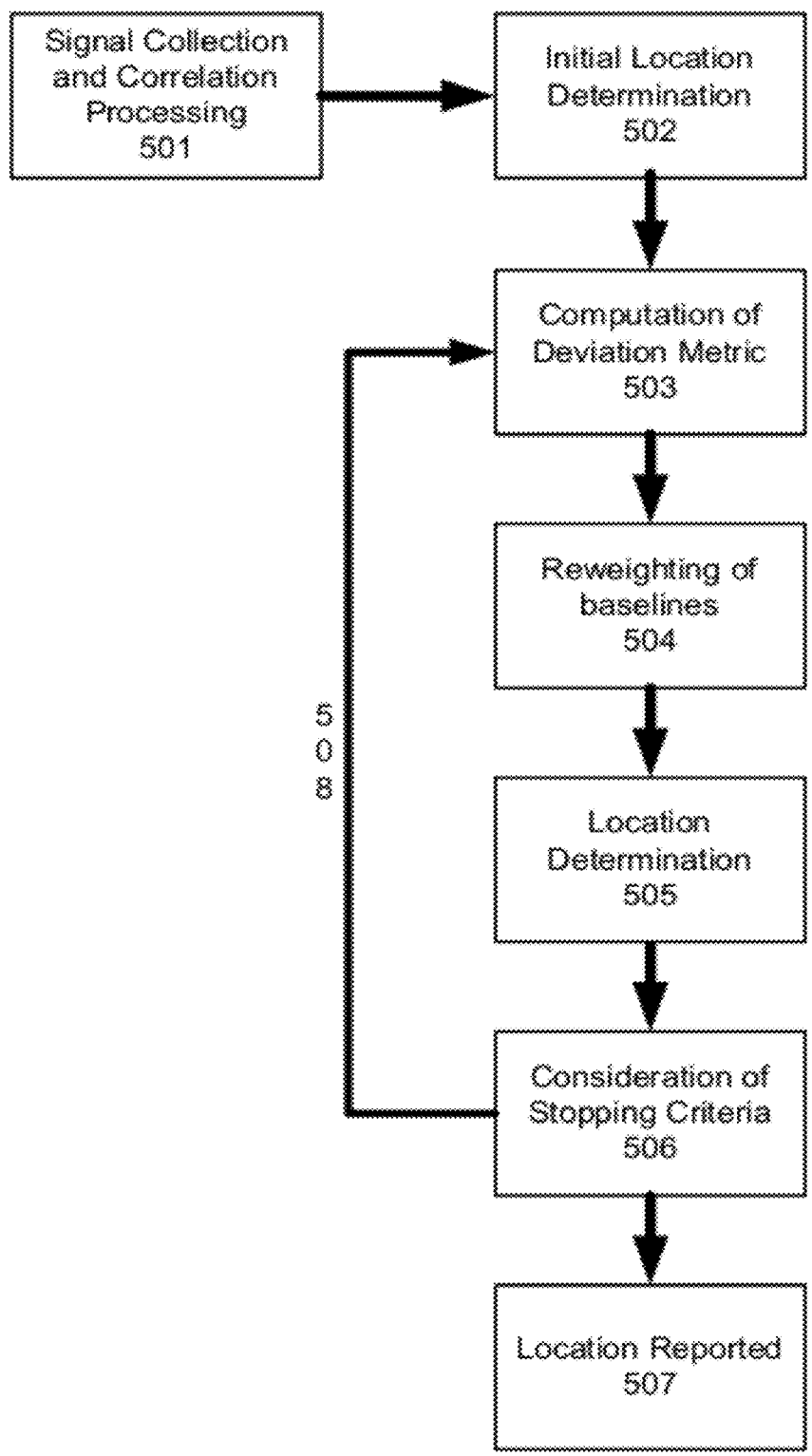
FIG. 5 illustrates an example procedure for practicing aspects of iterative TDOA.

FIG. 5 depicts an exemplary procedure for iterative baseline positioning. The location system is tasked by an external triggering platform 501 and signal collection and correlation processing is performed. Details of triggering platforms, both control-plane and user plane based, can be found in TruePosition U.S. Pat. No. 7,167,713 "Monitoring of call information in a wireless location system," U.S. Pat. No. 6,782,264; "Monitoring of call information in a wireless location system," U.S. patent application Ser. No. 11/150,414; "Advanced triggers for location-based service applications in a wireless location system," and U.S. patent application Ser. No. 11/533,310; "USER PLANE UPLINK TIME DIFFERENCE OF ARRIVAL (U-TDOA)."

In the initial location determination 502, the baselines are ordered according to their calculated weight or quality metric. The initial location solution is found using the highest weighted N baselines. N may be a fixed or predetermined number (e.g., 3) or may be dynamically set by inclusion of all baselines above a predefined threshold where the threshold is set high enough to reject false detects. If in the event the threshold method does not yield at least N baselines, then the threshold may be lowered to meet that minimum set. For example, a common correlation threshold may be used to select baselines of a sufficient quality.

A positioning algorithm (e.g. Least Squares, MUSIC, ROOT-MUSIC) may then be employed using the selected baselines. Using the result of the initial location determination 502, a deviation metric is computed 503 for all remaining baselines.

When computing the deviation metric, the baseline measurement error is computed assuming that the current location solution is accurate. The baselines with the smallest deviation are identified as the best candidates for use in subsequent iterations. This deviation provides a level of confidence for the baseline's accuracy and can be used to augment the theoretical weight of the baseline. In a preferred embodiment, the deviation metric is the magnitude of the difference between the measured TDOA value for the baseline and the TDOA value that is determined by the current location solution.

After the initial location determination 502 and computation of the deviation metric 503, an iterative sequence is entered, starting with the reweighting of baselines 504. Once a baseline is determined to be included in the location solution, the weight of that baseline may be modified based on the deviation. The baseline's weight is changed using a generalized weighting that includes the deviation contribution and the original weight as $$W'_i = pW_i + K(1-p)\left(\frac{1}{D_i}\right)^x$$

where, $W_i$ is the original weighting, $D_i$ is the deviation of the $i^{th}$ baseline, p is a parameter determining bias towards the original weighting (0<p<1), x is a predetermined exponent which may be derived empirically, derived mathematically, derived via simulation, or by other suitable means, and K is a constant ensuring that the sum of the generalized weights is equal to the sum of the original weights.

The above equation augments the conventional weighting operation by using the deviation metric as a way to incorporate information regarding how each individual baseline impacts the location solution. Conventional weighting considers each baseline in isolation and ignores interdependencies.

Once the baseline weighting has been updated 504, the location is re-determined using the additional baseline 505.

Stopping criteria are then considered 506 before reentry into the iterative cycle 508. The algorithm stops under the following conditions:

(1) No baselines: Additional baselines do not exist, or (2) Deviation too large: A predetermined baseline deviation threshold is exceeded. In a preferred embodiment, this threshold is different for different combinations of the number of baselines added and the number of baselines remaining, and may be derived empirically, derived mathematically, derived via simulation, or by other suitable means, or (3) Weight difference too large: The magnitude of the difference between the next candidate baseline's weight and the weight of the baseline that was most recently added provides another stopping condition. If this weight difference exceeds a predetermined threshold, then the algorithm stops. The predetermined threshold may be derived empirically, derived mathematically, derived via simulation, or by other suitable means.

Once any of the above conditions are met, the addition of baselines stops and the previous location solution computed in 505 is the final solution reported 507. Otherwise, the procedure re-iterates 508 for further computation of the deviation metric 503

Any of the above mentioned aspects can be implemented in methods, systems, computer readable media, or any type of manufacture. It should be understood to those skilled in the art that the various techniques described herein may be implemented in connection with hardware or software or, where appropriate, with a combination of both. For example, aspects of the invention may execute on a programmed computer. Thus, embodiments of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations. In example embodiments a computer readable storage media can include for example, random access memory (RAM), a storage device, e.g., electromechanical hard drive, solid state hard drive, etc., firmware, e.g., FLASH RAM or ROM, and removable storage devices such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges, and the like. The computer readable storage media may provide non-volatile storage of processor executable instructions, data structures, program modules and other data for a computer.

Conclusion

The true scope of the present invention is not limited to the presently preferred embodiments disclosed herein. For example, the foregoing disclosure of an iterative approach to increasing location accuracy uses explanatory terms, such as Evolved Packet Core (EPC), evolved Serving Mobile Location Center (eSMLC), Public Data Network Gateway (PGW), Location Measuring Unit (LMU), and the like, which should not be construed so as to limit the scope of protection of the following claims, or to otherwise imply that the inventive aspects of the iterative approach to increasing location accuracy are limited to the particular methods and apparatus disclosed. Moreover, as will be understood by those skilled in the art, many of the inventive aspects disclosed herein may be applied in location systems that are not based on TDOA techniques. For example, the invention is not limited to systems employing LMU's constructed as described above. The LMU's, eNB's, etc. are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the LMU) described herein to another functional element (such as the eNB) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

What is claimed:

1. A method for increasing the accuracy of a wireless location system (WLS), comprising:

receiving an uplink signal from a mobile device at a plurality of geographically dispersed location measuring units (LMUs);

correlating a reference signal with the uplink signal received at each of the plurality of LMUs;

defining a plurality of baselines corresponding to respective pairs of LMUs;

ranking the baselines based on a quality metric;

determining an initial location solution for the mobile device, wherein the initial location solution is based on at least two baselines but less than all of the baselines; and iteratively employing one or more additional baselines of the plurality of baselines to improve upon the initial location solution until a stopping condition is met.

2. A method as recited in claim 1, wherein the stopping condition is met when there is excessive deviation of a current estimate of the location solution from a prior estimate of the location solution.

3. A method as recited in claim 2, wherein the excessive deviation is determined based on an error estimation for the location solution.

4. A method as recited in claim 1, wherein a common correlation threshold is employed to select baselines of a predetermined quality for the initial location solution.

5. A method as recited in claim 1, wherein the initial location solution is employed to time filter correlation data corresponding to non-selected baselines, wherein the filtered correlation data is then evaluated against a secondary threshold to identify additional baselines of the plurality of baselines to include in the location solution.

6. A method as recited in claim 1, wherein the initial location solution is used to compute a deviation metric for remaining baselines.

7. A method as recited in claim 6, wherein, when computing the deviation metric, a baseline measurement error is computed assuming that the current location solution is accurate and baselines with the smallest deviation are identified as candidates for use in subsequent iterations.

8. A method as recited in claim 7, wherein the deviation metric is computed as the magnitude of the difference between a measured time difference of arrival (TDOA) value for one of the remaining baselines and a TDOA value determined by the initial location solution.

9. A method as recited in claim 8, wherein, after the initial location solution is determined and computation of the deviation metric, an iterative sequence is entered wherein the baselines identified as candidates for use in subsequent iterations are reweighted based on the deviation metric.

10. A method as recited in claim 9, wherein baselines are reweighted using a generalized weighting that includes a deviation contribution and an original weight as $$W'_i = pW_i + K(1-p)\left(\frac{1}{D_i}\right)^x$$

where, $W_i$, is the original weighting, $D_i$, is the deviation of the $i^{th}$ baseline p is a parameter determining bias towards the original weighting (0<p<1), x is a predetermined exponent derived empirically, mathematically, via simulation, or by other suitable means, and K is a constant ensuring that the sum of the generalized weights is equal to the sum of the original weights.

11. A method as recited in claim 10, wherein, once the baseline weighting has been updated, the location solution is re-determined using one or more additional baselines of the reweighted baselines.

12. A method as recited in claim 1, wherein said stopping condition is met when a determination is made that additional baselines do not exist.

13. A method as recited in claim 1, wherein said stopping condition is met when a determination is made that a predetermined baseline deviation threshold is exceeded.

14. A method as recited in claim 13, wherein said predetermined baseline deviation threshold is determined based on the number of baselines added and the number of baselines remaining.

15. A method as recited in claim 14, wherein said predetermined baseline deviation threshold is empirically determined.

16. A method as recited in claim 14, wherein said predetermined baseline deviation threshold is determined via simulation.

17. A method as recited in claim 1, wherein said stopping condition is met when a determination is made that a magnitude of the difference between a next candidate baseline's weight and a weight of the baseline that was most recently added exceeds a predetermined threshold.

18. A method as recited in claim 17, wherein said predetermined threshold is empirically determined.

19. A method as recited in claim 17, wherein said predetermined threshold is determined via simulation.

20. A method as recited in claim 12, wherein, once the stopping condition is met, a current location solution is the final solution reported.

21. A method as recited in claim 1, wherein said determining an initial location solution is based on the highest N baselines.

22. A method as recited in claim 21, wherein N is a predetermined number.

23. A method as recited in claim 21, wherein N is dynamically set by inclusion of all baselines above a predefined threshold wherein the predefined threshold is set high enough to reject false detects.

24. A method as recited in claim 23, wherein when the predefined threshold does not yield at least N baselines, the predefined threshold is lowered such that N baselines are selected.

25. A system configured to increase the accuracy of a wireless location system (WLS), the system comprising at least one processor and at least one storage medium communicatively coupled to said at least one processor, the storage medium having stored therein computer-executable instructions for instructing the processor in causing the following steps:

receiving an uplink signal from a mobile device at a plurality of geographically dispersed location measuring units (LMUs);

correlating a reference signal with the uplink signal received at each of the plurality of LMUs;

defining a plurality of baselines corresponding to respective pairs of LMUs;

ranking the baselines based on a quality metric;

determining an initial location solution for the mobile device, wherein the initial location solution is based on at least two baselines but less than all of the baselines; and iteratively employing one or more additional baselines of the plurality of baselines to improve upon the initial location solution until a stopping condition is met.

26. A system as recited in claim 25, wherein the stopping condition is met when there is excessive deviation of a current estimate of the location solution from a prior estimate of the location solution.

27. A system as recited in claim 26, wherein the excessive deviation is determined based on an error estimation for the location solution.

28. A system as recited in claim 25, wherein a common correlation threshold is employed to select baselines of a predetermined quality for the initial location solution.

29. A system as recited in claim 25, wherein the initial location solution is employed to time filter correlation data corresponding to non-selected baselines, wherein the filtered correlation data is then evaluated against a secondary threshold to identify additional baselines of the plurality of baselines to include in the location solution.

30. A system as recited in claim 25, wherein the initial location solution is used to compute a deviation metric for remaining baselines.

31. A system as recited in claim 30, wherein, when computing the deviation metric, a baseline measurement error is computed assuming that the current location solution is accurate and baselines with the smallest deviation are identified as candidates for use in subsequent iterations.

32. A system as recited in claim 30, wherein the deviation metric is computed as the magnitude of the difference between a measured time difference of arrival (TDOA) value for one of the remaining baselines and a TDOA value determined by the initial location solution.

33. A system as recited in claim 32, wherein, after the initial location solution is determined and computation of the deviation metric, an iterative sequence is entered wherein the baselines identified as candidates for use in subsequent iterations are reweighted based on the deviation metric.

34. A system as recited in claim 33, wherein baselines are reweighted using a generalized weighting that includes a deviation contribution and an original weight as $$W_i' = pW_i + K(1-p)\left(\frac{1}{D_i}\right)^x$$

where, $W_i$, is the original weighting,
$D_i$, is the deviation of the $i^{th}$ baseline
p is a parameter determining bias towards the original weighting (0<p<1),
x is a predetermined exponent derived empirically, mathematically, via simulation, or by other suitable means, and
K is a constant ensuring that the sum of the generalized weights is equal to the sum of the original weights.

35. A system as recited in claim 34, wherein, once the baseline weighting has been updated, the location solution is re-determined using one or more additional baselines of the reweighted baselines.

36. A system as recited in claim 25, wherein said stopping condition is met when a determination is made that additional baselines do not exist.

37. A system as recited in claim 25 wherein said stopping condition is met when a determination is made that a predetermined baseline deviation threshold is exceeded.

38. A system as recited in claim 37, wherein said predetermined baseline deviation threshold is determined based on the number of baselines added and the number of baselines remaining.

39. A system as recited in claim 38, wherein said predetermined baseline deviation threshold is empirically determined.

40. A method as recited in claim 38, wherein said predetermined baseline deviation threshold is determined via simulation.

41. A system as recited in claim 25, wherein said stopping condition is met when upon a determination that a magnitude of the difference between a next candidate baseline's weight and a weight of the baseline that was most recently added exceeds a predetermined threshold.

42. A system as recited in claim 41, wherein said predetermined threshold is empirically determined.

43. A system as recited in claim 41, wherein said predetermined threshold is determined via simulation.

44. A system as recited in claim 36, wherein, once the stopping condition is met, a current location solution is the final solution reported.

45. A system as recited in claim 25, wherein said determining an initial location solution is based on the highest N baselines.

46. A system as recited in claim 45, wherein N is a predetermined number.

47. A system as recited in claim 45, wherein N is dynamically set by inclusion of all baselines above a predefined threshold wherein the predefined threshold is set high enough to reject false detects.

48. A system as recited in claim 47, wherein when the predefined threshold does not yield at least N baselines, the predefined threshold is lowered such that N baselines are selected.

49. A non-transitory computer readable storage medium storing thereon computer executable instructions for increasing the accuracy of a wireless location system (WLS), said computer executable instructions comprising:
instructions for receiving an uplink signal from a mobile device at a plurality of geographically dispersed location measuring units (LMUs);
instructions for correlating a reference signal with the uplink signal received at each of the plurality of LMUs;
instructions for defining a plurality of baselines corresponding to respective pairs of LMUs;
instructions for ranking the baselines based on a quality metric;
instructions for determining an initial location solution for the mobile device, wherein the initial location solution is based on at least two baselines but less than all of the baselines; and
instructions for iteratively employing one or more additional baselines of the plurality of baselines to improve upon the initial location solution until a stopping condition is met.

50. A non-transitory computer readable storage medium as recited in claim 49, wherein the stopping condition is met when there is excessive deviation of a current estimate of the location solution from a prior estimate of the location solution.

51. A non-transitory computer readable storage medium as recited in claim 50, wherein the excessive deviation is determined based on an error estimation for the location solution.

52. A non-transitory computer readable storage medium as recited in claim 49, wherein a common correlation threshold is employed to select baselines of a predetermined quality for the initial location solution.

53. A non-transitory computer readable storage medium as recited in claim 49, wherein the initial location solution is employed to time filter correlation data corresponding to non-selected baselines, wherein the filtered correlation data is then evaluated against a secondary threshold to identify additional baselines of the plurality of baselines to include in the location solution.

54. A non-transitory computer readable storage medium as recited in claim 49, wherein the initial location solution is used to compute a deviation metric for remaining baselines.

55. A non-transitory computer readable storage medium as recited in claim 54, wherein, when computing the deviation metric, a baseline measurement error is computed assuming that the current location solution is accurate and baselines with the smallest deviation are identified as candidates for use in subsequent iterations.

56. A non-transitory computer readable storage medium as recited in claim 54, wherein the deviation metric is computed as the magnitude of the difference between a measured time difference of arrival (TDOA) value for one of the remaining baselines and a TDOA value determined by the initial location solution.

57. A non-transitory computer readable storage medium as recited in claim 56, wherein, after the initial location solution is determined and computation of the deviation metric, an iterative sequence is entered wherein the baselines identified as candidates for use in subsequent iterations are reweighted based on the deviation metric.

58. A non-transitory computer readable storage medium as recited in claim 57, wherein baselines are reweighted using a generalized weighting that includes a deviation contribution and an original weight as $$W'_i = pW_i + K(1-p)\left(\frac{1}{D_i}\right)^x$$

where, $W_i$, is the original weighting,
$D_i$, is the deviation of the $i^{th}$ baseline
p is a parameter determining bias towards the original weighting (0<p<1),
x is a predetermined exponent derived empirically, mathematically, via simulation, or by other suitable means, and
K is a constant ensuring that the sum of the generalized weights is equal to the sum of the original weights.

59. A non-transitory computer readable storage medium as recited in claim 58, wherein, once the baseline weighting has been updated, the location solution is re-determined using one or more additional baselines of the reweighted baselines.

60. A non-transitory computer readable storage medium as recited in claim 49, wherein said stopping condition is met when it is determined that additional baselines do not exist.

61. A non-transitory computer readable storage medium as recited in claim 49 wherein said stopping condition is met upon determining that a predetermined baseline deviation threshold is exceeded.

62. A non-transitory computer readable storage medium as recited in claim 61, wherein said predetermined baseline deviation threshold is determined based on the number of baselines added and the number of baselines remaining.

63. A non-transitory computer readable storage medium as recited in claim 62, wherein said predetermined baseline deviation threshold is empirically determined.

64. A non-transitory computer readable storage medium as recited in claim 62, wherein said predetermined baseline deviation threshold is determined via simulation.

65. A non-transitory computer readable storage medium as recited in claim 49, wherein said stopping condition is met upon determining that a magnitude of the difference between a next candidate baseline's weight and a weight of the baseline that was most recently added exceeds a predetermined threshold.

66. A non-transitory computer readable storage medium as recited in claim 65, wherein said predetermined threshold is empirically determined.

67. A non-transitory computer readable storage medium as recited in claim 65, wherein said predetermined threshold is determined via simulation.

68. A non-transitory computer readable storage medium as recited in claim 60, wherein, once the stopping condition is met, a current location solution is the final solution reported.

69. A non-transitory computer readable storage medium as recited in claim 49, wherein said determining an initial location solution is based on the highest N baselines.

70. A non-transitory computer readable storage medium as recited in claim 69, wherein N is a predetermined number.

71. A non-transitory computer readable storage medium as recited in claim 69, wherein N is dynamically set by inclusion of all baselines above a predefined threshold wherein the predefined threshold is set high enough to reject false detects.

72. A non-transitory computer readable storage medium as recited in claim 71, wherein when the predefined threshold does not yield at least N baselines, the predefined threshold is lowered such that N baselines are selected.

* * * * *